United States Patent [19]

Skarvan

[11] Patent Number: 5,775,090
[45] Date of Patent: Jul. 7, 1998

[54] TORQUE SIGNAL SYNTHESIS METHOD AND SYSTEM FOR A GAS TURBINE ENGINE

[75] Inventor: Charles Anthony Skarvan, Indianapolis, Ind.

[73] Assignee: Allison Engine Company, Indianapolis, Ind.

[21] Appl. No.: 774,283

[22] Filed: Dec. 23, 1996

[51] Int. Cl.⁶ .................................................. F02C 9/00
[52] U.S. Cl. ........................ 60/39.03; 60/39.282
[58] Field of Search ........................ 60/39.03, 39.281, 60/39.282, 243

[56] References Cited

U.S. PATENT DOCUMENTS

| | | |
|---|---|---|
| 3,930,366 | 1/1976 | Nelson . |
| 3,963,372 | 6/1976 | McLain et al. . |
| 3,984,701 | 10/1976 | Pieper . |
| 4,212,161 | 7/1980 | Newirth et al. . |
| 4,228,650 | 10/1980 | Camp . |
| 4,249,238 | 2/1981 | Spang, III et al. . |
| 4,307,451 | 12/1981 | Zagranski et al. . |
| 4,423,594 | 1/1984 | Ellis .................. 60/39.281 |
| 4,453,378 | 6/1984 | Zagranski et al. . |
| 4,467,640 | 8/1984 | Morrison .............. 73/117.3 |
| 4,522,026 | 6/1985 | Peterson et al. . |
| 4,594,849 | 6/1986 | Kenison et al. ......... 60/39.29 |
| 4,641,517 | 2/1987 | Spock et al. . |
| 4,693,077 | 9/1987 | Skarvan et al. . |
| 4,722,061 | 1/1988 | Carlisle et al. . |
| 4,736,331 | 4/1988 | Lappos et al. . |
| 4,748,804 | 6/1988 | Krukoski . |
| 4,999,991 | 3/1991 | Haddad et al. . |
| 5,274,558 | 12/1993 | High et al. . |
| 5,379,584 | 1/1995 | Windish et al. . |
| 5,394,689 | 3/1995 | D'Onofrio . |
| 5,436,826 | 7/1995 | O'Flarity . |
| 5,447,023 | 9/1995 | Meisner et al. . |

*Primary Examiner*—Louis J. Casaregola
*Attorney, Agent, or Firm*—Woodard, Emhardt, Naughton, Moriarty & McNett

[57] ABSTRACT

A torque signal synthesis method is provided to accommodate torque measurements for a gas turbine engine. The torque signal is synthesized from gas pressure sensed at an engine station. The synthesized torque signal may include a correction factor which accounts for the deviation of the engine from a nominal characteristic. This correction factor is determined during engine operation and periodically updated to account for changes in the deviation. The synthesized torque signal may further be determined from the corrected speed of a gasifier rotor and power turbine of a free turbine engine configuration.

45 Claims, 3 Drawing Sheets

TORQUE SIGNAL SYNTHESIS METHOD AND SYSTEM FOR A GAS TURBINE ENGINE

BACKGROUND OF THE INVENTION

The present invention relates to gas turbine engines, and more particularly, but not exclusively, relates to synthesis of a sensor signal for a gas turbine engine.

The proper operation of gas turbine engines often relies on monitoring several engine parameters with corresponding sensors. Typically, sensors are located at several different engine stations. Failure of any of these sensors may cause serious engine operation problems. Consequently, various sensor failure accommodation schemes have been proposed. U.S. patent application Ser. No. 08/473,720, filed on Jun. 7, 1995; and U.S. Pat. Nos. 5,394,689 to D'Onofrio, 4,748,804 to Krukoski, 4,522,026 to Peterson et al., 4,307,451 to Zagranski et al., 4,228,650 to Camp, and 4,212,161 to Newirth et al. are cited as sources of background information concerning various sensor accommodation schemes and are hereby incorporated by reference.

In applications that use a gas turbine engine to turn a drive shaft, torque of the drive shaft is often monitored with a torque meter (or equivalently a torque sensor). One possible way to accommodate a failed torque meter is to determine a replacement signal from sensors monitoring working fluid characteristics in the vicinity of the power turbine turning the drive shaft. Unfortunately, this approach may not be suitable for all engine systems. Typically, the extreme environmental conditions about the power turbine makes monitoring the temperature and pressure of working fluid in this region difficult. Furthermore, even if sensors are available, they may not be capable of providing the degree of resolution or reliability desired for the synthesized signal. In most instances, the addition of sensors for accommodation purposes is not cost effective.

Another problem with some torque monitoring arrangements is that they have a rather limited range and may not respond well to transient torques. Thus, new systems and methods for synthesizing output torque of a gas turbine engine are in demand. Preferably, these new systems will not require sensors in the vicinity of a turbine.

Moreover, accommodation schemes may rely on a nominal engine performance curve, sometimes called a "schedule" or "characteristic," which provides the quantitative relationship between two or more engine parameters. The accuracy of this curve for a given engine depends on how closely the given engine corresponds to the target design criteria or sample engine (or engines) upon which the curve is based. Thus, it is generally expected that most engines will deviate from a nominal characteristic within an established tolerance—especially as engines age and wear over time. Synthesizing a signal from a nominal characteristic without accounting for the normal deviation of the engine may lead to significant inaccuracy or imprecision in the synthesized signal. Thus, it is also preferred that new synthesis systems and methods account for engine deviation from nominal. The present invention satisfies these needs and provides other important advantages.

SUMMARY OF THE INVENTION

The present invention relates to operation of a gas turbine engine with a synthesized signal configured to replace the signal from an unreliable signal originating from a sensor. Various aspects of this invention are novel, non-obvious, and provide various advantages. While the actual nature of the invention covered herein can only be determined with reference to the claims appended hereto, certain aspects which are characteristic of the preferred embodiment are described briefly as follows.

In one aspect of the present invention, a process for operating a gas turbine engine is provided. This process includes sensing a torque produced by the engine with a torque sensor, determining the sensor is performing unreliably, and operating the engine with the torque being determined as a function of gas pressure at a pre-combustion station of the engine during unreliable performance of the sensor. Preferably, for a free-turbine engine application, torque may be further determined as a function of the gasifier rotor speed, the power turbine speed, and engine inlet temperature. This process typically avoids the need to rely on working fluid sensors in the vicinity of a turbine for torque signal synthesis. As used herein, a "pre-combustion station" includes any location where one or more characteristics of the engine working fluid may be detected prior to combustion of that working fluid in the engine.

In another aspect of the present invention, an aircraft propulsion system includes a gas turbine engine and a first sensor that provides a first torque signal corresponding to torque produced by the engine. The system also includes a second sensor that provides a pressure signal corresponding to a gas pressure at a pre-combustion station of the engine. A controller is included that responds to the first torque signal and pressure signal by generating a second torque signal. The second torque signal corresponds to torque produced by the engine and is determined as a function of the pressure signal. The second torque signal may be further determined as a function of the rotational speed of one or more engine components and engine inlet temperature. The controller also generates an accommodation signal when the first torque signal is determined to be unreliable. In response to this accommodation signal, the controller operates with the second torque signal in place of the first torque signal.

In yet another aspect of the present invention, a gas turbine engine is operated by sensing torque produced by the engine with a sensor to provide a measured torque signal for operation of the engine in a non-fault mode. A synthesized torque signal is generated from a nominal relationship between at least two engine parameters. An adjustment signal is established that corresponds to deviation of the engine from the nominal relationship. The synthesized torque signal is corrected with the adjustment signal and used in place of the measured torque signal during operation of the engine in a fault mode. This fault mode is established when the measured torque signal is determined to be unreliable.

In still another aspect of the present invention, a gas turbine engine having a power turbine is operated by providing a first signal representing a gas pressure associated with the performance of the engine. A second signal is also provided which represents the rate of change of rotational speed of the power turbine. A third signal is provided which corresponds to torque produced by the engine. Furthermore, a fourth signal is generated from the first and second signals which also corresponds to torque produced by the engine. This fourth signal is used in place of the third signal if the third signal is determined to be unreliable.

Accordingly, one object of the present invention is to provide a torque signal synthesis system and method.

It is another object of the present invention to provide an accommodation technique which accounts for deviation of a gas turbine engine from nominal.

Still another object of the present invention is to synthesize a replacement torque signal which does not require measurements from working fluid sensors located in the vicinity of a power turbine.

Further objects, advantages, features, and aspects of the present invention shall become apparent from the detailed description and drawings contained herein.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

Figure 1:
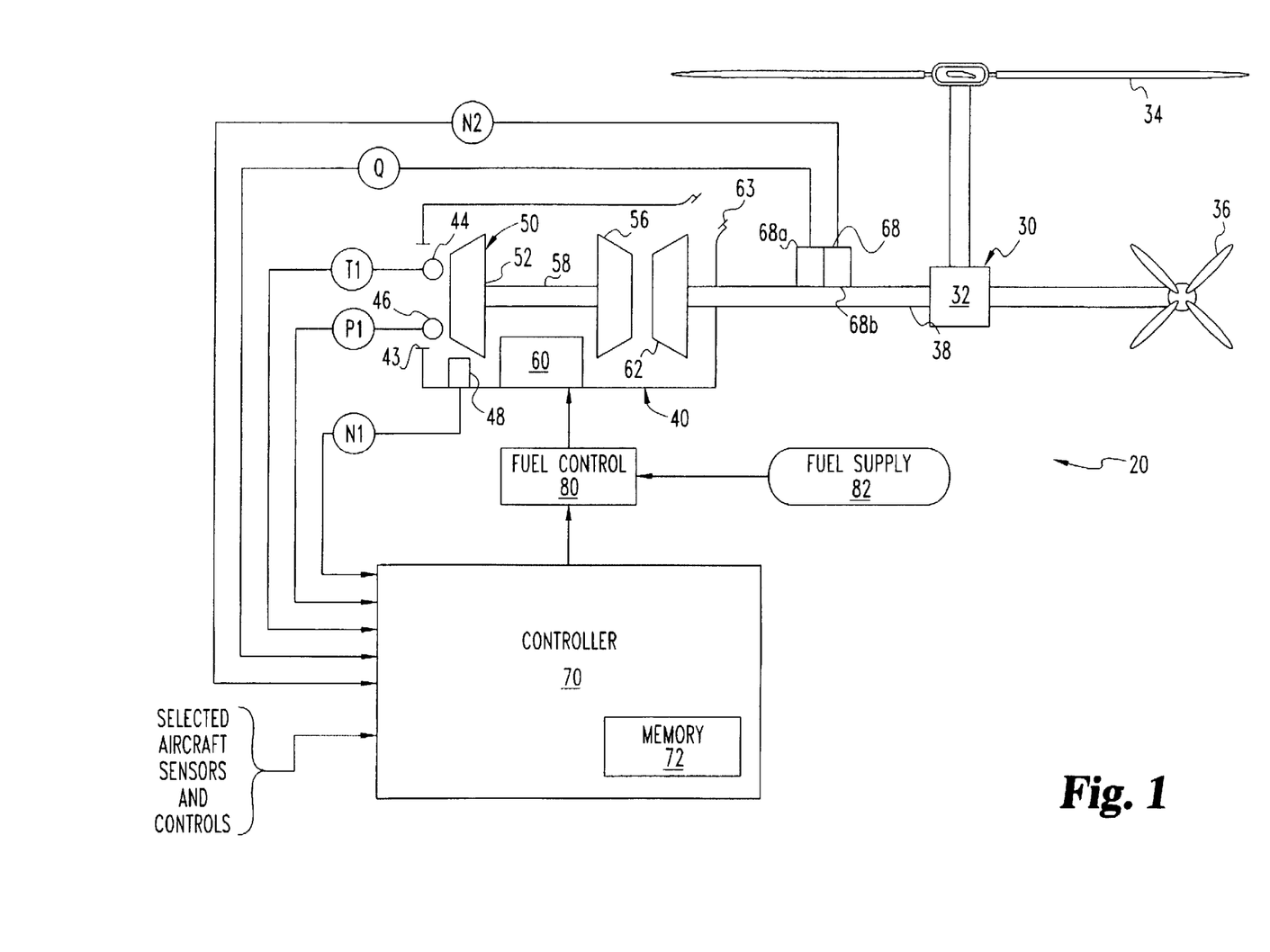
FIG. 1 is a diagrammatic view of an aircraft system of one embodiment of the present invention.

FIG. 1 schematically depicts an aircraft system 20 of one embodiment of the present invention. System 20 includes aircraft propulsion mechanism 30 of the type commonly used for helicopters. Mechanism 30 has a gear box 32 which is configured to turn rotary wing 34 and tail rotor 36. Typically, rotary wing 34 and tail rotor 36 are driven at different rotational speeds. Gear box 32 is driven by shaft 38 which is in turn driven by gas turbine engine 40. Gas turbine engine 40 has inlet 43 for the intake of a working fluid. Adjacent inlet 43 are temperature sensor 44 providing inlet temperature signal T1 and pressure sensor 46 providing inlet pressure signal P1. Sensor 48 of engine 40 registers rotational speed of gas generating spool or "gasifier" spool 50. The rotational speed of spool 50 is provided by sensor 48 as signal N1.

Gas turbine engine 40 is preferably of a free turbine variety with spool 50 having compressor 52 adjacent inlet 43. Compressor 52 is driven by turbine 56 which is connected by spool shaft 58. Compressor 52, turbine 56, and shaft 58 of spool 50 are all configured to rotate together in a conventional manner.

Generally, air is drawn through inlet 43 to serve as a working fluid which is then compressed by compressor 52. Fuel is introduced into the working fluid after discharge from compressor 52 and ignited with combustor 60. The expanding gasses resulting from this combustion turn turbine 56. In response, shaft 58 and compressor 52 are rotated which continues the process of compressing working fluid for combustion as long as air and fuel are appropriately supplied to engine 40. Indeed, the mass flow rate of air and flow rate of fuel are among the primary factors influencing gas turbine engine performance.

As working fluid departs turbine 56, power turbine 62 is encountered. In response, power turbine 62 rotates and correspondingly turns shaft 38 to drive mechanism 30. The working fluid departing from power turbine 62 exits engine 40 through duct 63 as exhaust. Torque produced by rotation of shaft 38 is detected with dual sensor arrangement 68. Arrangement 68 includes sensing device 68a to sense output torque which is provided as signal Q, and sensing device 68b to provide rotational speed of shaft 38 as signal N2. In one embodiment, engine 40 is the model 250 free-turbine engine produced by Allison Engine Company of Indianapolis, Ind.; however, other configurations of gas turbine engine 40 may be employed as would occur to one skilled in the art, including, but not limited to, an arrangement with a single turbine, or a multiple compressor/turbine spool arrangement.

In one embodiment of the present invention, dual sensor arrangement 68 may be provided by the torque/speed sensing mechanisms disclosed in U.S. Pat. Nos. 3,963,372 to McLain et al., 3,930,366 to Nelson, 3,984,701 to Pieper, or 4,693,077 to Skarvan et al. which are hereby incorporated by reference. Notably, in at least some of these systems, output shaft rotational speed is detected in multiple locations to assist in determining whether the shaft has broken. Typically, the detection of Q with this type of mechanism results from a rotational phase angle measured by comparing the relative movement of two toothed discs rotating with the drive shaft. One disc is attached to the loaded shaft and the other on an unloaded sleeve mounted about the shaft. As a result, the phase angle is caused by a "twist" along the portion of the drive shaft between the two discs which is proportional to the output torque. In contrast, the measurement of N2 depends on monitoring only one of the discs. As a result, N2 may often be reliably measured with this arrangement even when Q is not reliable.

In alternative embodiments, Q and N2 may be provided by completely independent sensor structures. For example, in one alternative embodiment, Q may be provided by a conventional hydraulic torque meter with rotational speed of the shaft being detected by one or more separate sensing devices. In still other embodiments, measured signals N1, N2, T1, P1, and Q are provided using conventional techniques and sensing devices as are known to those skilled in the art.

As illustrated in FIG. 1, signals N1, N2, T1, P1, and Q are provided to controller 70 along with various other aircraft sensors and controls. Preferably, these controls include additional engine monitoring signals and pilot-operated inputs such as a Power Lever Angle (PLA) device used to adjust the power output of engine 40.

Controller 70 is comprised of one or more components and includes memory 72. Circuitry for Memory 72 may be combined with circuitry for controller 70 on a single integrated circuit chip, or comprised of one or more separate components of a solid state, electromagnetic, optical, or other variety as would occur to one skilled in the art. Controller 70 may include analog circuitry, digital circuitry, or a hybrid combination of both of these types. In one embodiment, controller 70 is of the programmable variety which executes algorithms or processes data in accordance with software or firmware instructions loaded therein. This embodiment may also have appropriate functions hardwired into one or more logic devices. In another embodiment, controller 70 has substantially all of the functions provided by dedicated hardware. It is preferred that controller 70 be configured to operate as a Full Authority Digital Engine Control (FADEC). Examples of suitable FADECs for the present invention include, but are not limited to, Allison Engine Company's model 250 FADEC and model T800 FADEC.

Controller 70 generates an output demand signal WF to meter fuel flow to engine 40. Fuel control 80 responds to signal WF to regulate the flow of fuel from supply 82 to combustor 60. In one embodiment, controller 70 is configured with an algorithm and a fueling schedule which adjusts WF in accordance with pilot input to controller 70, and signals P1, N1, T1, and N2. Similarly, controller 70 may include an algorithm which responds to signal Q to protect gear box 32 from excessive torque and otherwise indicate loading on shaft 38. In still another embodiment, operation of engine 40 may be controlled with signals N1, N2, T1, P1, and Q using techniques as would occur to those skilled in the art.

Among the operations regulated by controller 70, is torque synthesis process 120. Process 120 is configured to generate a substitute torque signal should arrangement 68 fail to provide a reliable Q signal. Selected variables of process 120 are briefly introduced as follows:

CF correction factor to account for deviation of engine 40 from nominal (CFI, CFU, and CFPAST are intermediate variables corresponding to CF);

DELTA measured correction factor determined in accordance with DELTA=P1/14.696, where P1 is a measured pressure signal and the value 14.696 is a normalization constant corresponding to standard day pressure, both P1 and the 14.696 constant are in units of psia so that DELTA is unitless (DCALC is a derived variable corresponding to DELTA);

N1 engine gasifier spool 50 rotational speed determined from sensor 48, (typically in units of RPM or %, where N1=100% represents a specific pre-determined rotational speed);

N1C N1 corrected to temperature T1 (typically in units of RPM or %) in accordance with N1C=N1/(SQRT (THETA));

N1DOT first derivative with respect to time of N1 indicating rate of change of N1 (typically in units of RPM/sec., radians/sec.$^2$, or %/sec.);

N2 power turbine 62 and drive shaft 38 rotational speed from arrangement 68 (typically in units of RPM or %, where N2=100% represents a specific, pre-determined rotational speed);

N2C N2 corrected to temperature T1 (typically in units of RPM or %) in accordance with N2C=N2/(SQRT (THETA));

N2DOT first derivative of N2 with respect to time indicating rate of change of N2 (typically in units of RPM/sec., radians/sec.$^2$, or %/sec.);

P1 compressor inlet pressure measured with sensor 46 (typically in units of psia);

QFAIL discrete signal indicating faulty or unreliable Q signal from arrangement 68;

Q engine output shaft torque determined from arrangement 68 (typically in units of ft-lbs);

QD dynamic torque of engine 40 (typically in units of ft-lbs);

QCALC derived value of thermodynamic torque from an engine characteristic (typically in units of ft-lbs);

QTM torque signal determined from arrangement 68 or synthesized from other sensors (typically in units of ft-lbs) (intermediate variables QCALC, QSYN, QSYNC, and QSYNCF correspond to QTM);

T1 inlet temperature determined from sensor 44 (typically in units of degrees Rankine, °R);

THETA correction factor determined in accordance with THETA=T1/518.7, where T1 is a inlet temperature and the value 518.7 is a normalization constant corresponding to standard day ambient air temperature, both T1 and the 518.7 constant are in units of degrees Rankine (°R) so that THETA is unitless;

SEL1 discrete intermediate selection signal;

SEL2 discrete intermediate selection signal;

SQRT( ) is a square root operator which returns the square root of the argument enclosed in the parenthesis. Furthermore, process 120 employs constants C1, C2, C3, C4 in various conditional operations as described hereinafter.

Figure 2:
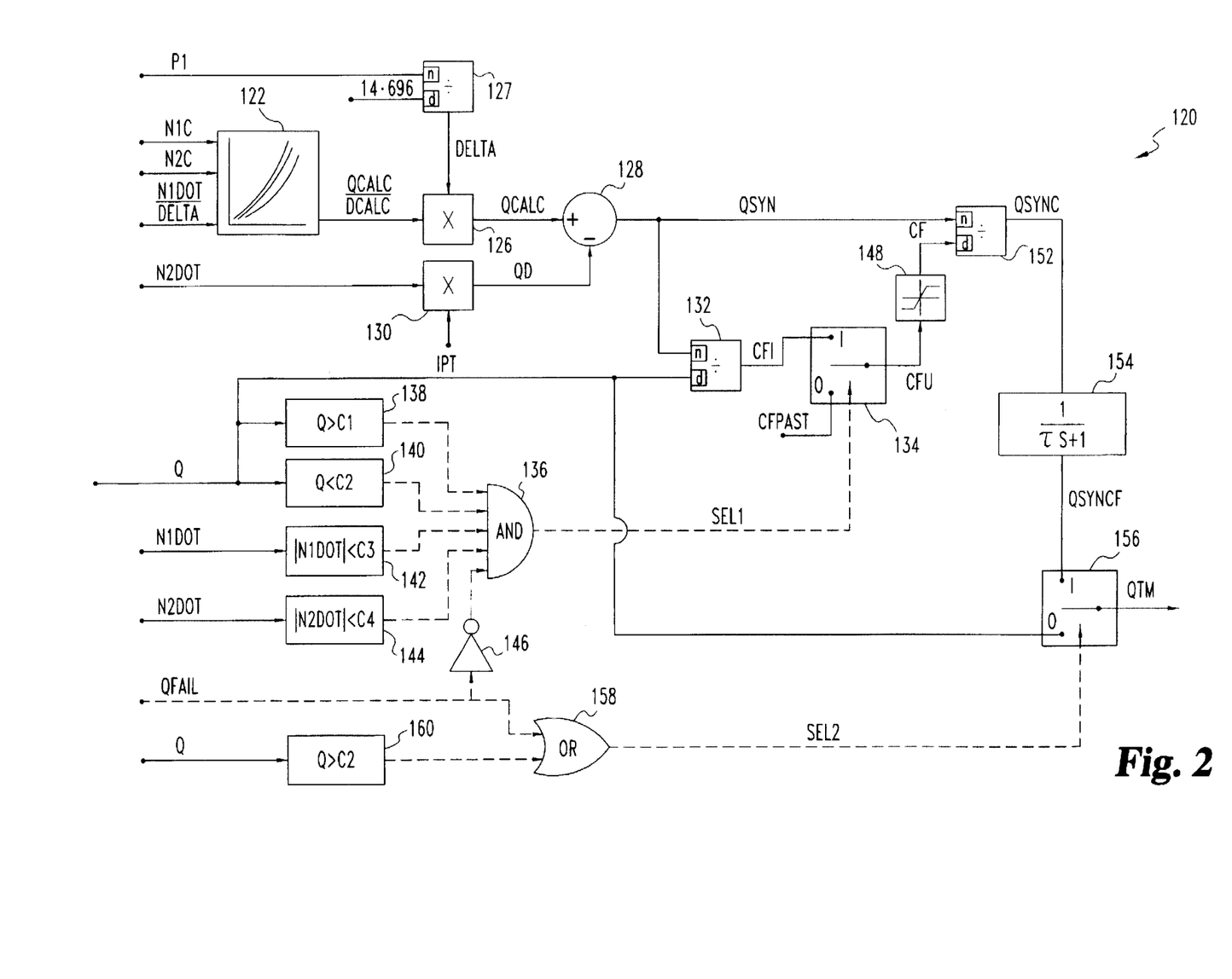
FIG. 2 is a signal flow diagram depicting a signal synthesis process for the embodiment of FIG. 1.
Figure 3:
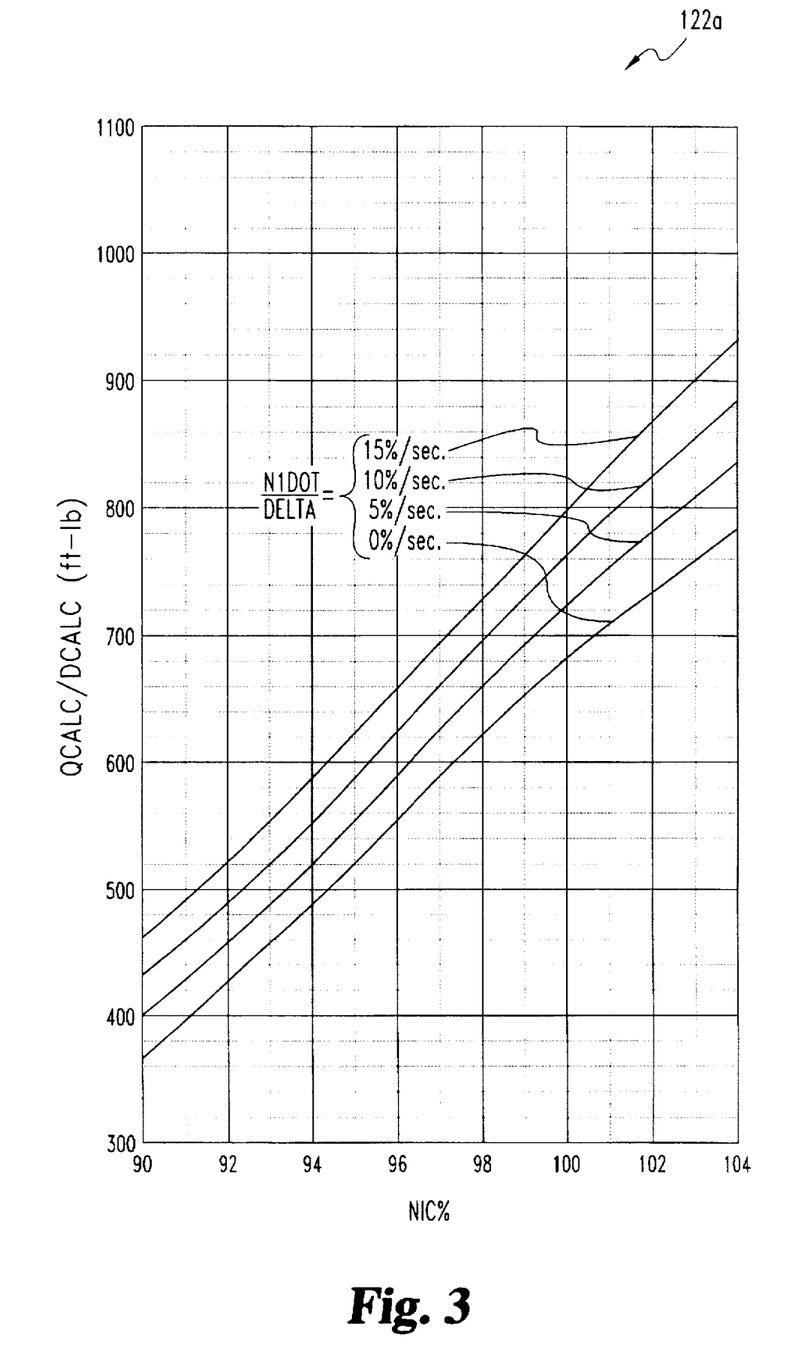
FIG. 3 is a graph depicting a representative engine characteristic for the process depicted in FIG. 2.

Referring to FIGS. 2 and 3, process 120 is further discussed. In FIG. 2, solid lines represent signals which may have a range of different levels or values and dashed lines represent discrete signals having two states, active and inactive, corresponding to 1 and 0. The lower case letters "n" and "d" represent numerator (n) and denominator (d), respectively, of various division operators illustrated in FIG. 2.

Function 122 of FIG. 2 generates an output from a nominal characteristic 122a for engine 40. FIG. 3 depicts a portion of characteristic 122a for a particular embodiment of the present invention having an Allison Engine Company model 250-C30R/3 free-turbine configuration for engine 40. Characteristic 122a depicts corrected thermodynamic torque QCALC/DCALC along the vertical axis as a function of N1C along the horizontal axis. The variable N1C is determined from input N1 in accordance with N1C=N1/(SQRT (THETA)) and THETA=T1/518.7. A family of QCALC/DCALC versus N1C curves is representatively depicted in FIG. 3 in terms of N1DOT/DELTA, where N1DOT is the first time derivative of N1 and correction factor DELTA= P1/14.696. The corrected value N1DOT/DELTA may be expressed in terms of the rate of change of percent speed indicated as %/sec. In FIG. 3, four representative curves are depicted in 5% increments of N1DOT/DELTA from 0% through 15%/sec. This curve family assumes a constant value for N2C. Specifically, N2C=100% for the family illustrated in FIG. 3, where N2C=N2/(SQRT(THETA)) and THETA=T1/518.7. Preferably, characteristic 122a includes a number of curve families each corresponding to a different N2C value. In one embodiment, these curve families are provided for N2C values ranging from 70% to 110% in 5% increments.

Function 122 outputs a selected QCALC/DCALC ratio from the the N1C, N1DOT/DELTA, and N2C inputs. N1C, N1DOT/DELTA, and N2C are determined from sensors 44, 46, 48, and 68 using conventional techniques. By way of explanation, one way to determine the output QCALC/DCALC as a function of N1C, N1DOT/DELTA, and N2C is to: (1) calculate N2C from input N2, (2) apply the calculated N2C value to select the appropriate family of QCALC/DCALC versus N1C curves for different N1DOT/DELTA increments, (3) apply input N1DOT/DELTA to select the corresponding QCALC/DCALC versus N1C curve from the selected family of curves, (4) calculate N1C from the N1C input, and (5) apply the calculated N1C value to select the proper QCALC/DCALC output. Notably, the QCALC/DCALC output may be interpolated when N2C or N1DOT/DELTA lie between available increments, using techniques known to those skilled in the art.

The corresponding QCALC/DELTA is then output to multiplier 126 as an operand. Besides QCALC/DCALC, another operand input to multiplier 126 is DELTA. DELTA is provided by divider 127 from an input numerator (n) of P1 and an input denominator (d) of the normalization constant, 14.696, such that DELTA=P1/14.696. DELTA is also used for the N1DOT/DELTA input ratio to function 122.

At this point in process 120, it is assumed that DCALC and DELTA generally cancel through the operation of multiplier 126 even though DCALC is based on a nominal characteristic and DELTA is a measured value. Generally, any error introduced by this assumption is addressed by the application of a correction factor in a later stage. The resulting output of multiplier 126, QCALC, corresponds to the total thermodynamic torque resulting from typical engine 40 performance. QCALC is input to summation operator 128 as a positive operand. Signal QD is input to summation operator 128 as a negative operand. Signal QD is the measured dynamic torque of engine 40 and is generated by multiplier 130. Multiplier 130 outputs signal QD as the product of input signal operands N2DOT and IPT (QD=N2DOT*IPT), where N2DOT is the first derivative with respect to time of N2 and IPT is the polar moment of inertia of power turbine 62. IPT is a constant determined as a function of the geometry of engine 40 using conventional techniques. The determination of N1C and N1DOT from N1, and N2C and N2DOT from N2, may be performed using techniques known to those skilled in the art (not shown for clarity).

The output of operator 128 is QSYN, where QSYN= QCALC-QD. By subtracting QD, the synthesized signal QSYN corresponds to the output torque typically measured from shaft 38 by arrangement 68 and provided as signal Q, typically referred to as torque meter torque. Notably, if the engine is operating under steady state, non-fault conditions (N1DOT=0, N2DOT=0, QFAIL=0)), then the thermodynamic torque produced by engine 40 (nominally QCALC) is generally the same as Q or QSYN because QD=0. U.S. Pat. No. 4,693,077 to Skarvan is cited as a reference for additional background information concerning torque calculations.

It should be appreciated that engine 40 preferably generates signal QSYN even before unreliable operation of signal Q is detected. During this non-fault mode, a correction factor is determined and periodically updated. This correction factor accounts for the deviation of engine 40 from the nominal characteristic 122a of function 122. The instantaneous correction factor, CFI, is determined with divider 132. Signal QSYN is input to divider 132 as numerator (n) and signal Q is input to divider 132 as denominator (d). Output signal CFI of divider 132 is the ratio of QSYN to Q (CFI=QSYN/Q). During non-fault operation, this ratio effectively compares the synthesized and measured signals to provide the relative amount the engine deviates from nominal. Preferably, through periodic updates during engine operation, this ratio accounts for variation of engine deviation over time due to such factors as aging or wear.

Output signal CFI of divider 132 is provided to selector 134. Selector 134 responds to an active state of discrete signal SEL1 to pass through input CFI as output CFU (CFU=CFI). If SEL1 is inactive (SEL1=0) then CFPAST is passed through selector 134 as output CFU (CFU= CFPAST). Selector 134 is employed to assure a reliable correction factor, CFU is provided. Specifically, selector 134 substitutes CFPAST for CFI when N1, N2 or Q measurements indicate an unreliable CFI value. These conditions are tested by "and" gate 136 which outputs an active SEL1 signal (SEL1=1) only if all discrete inputs are active.

One of these inputs is provided by function 138 which tests whether Q is greater than a lower limit C1. If Q is greater, then the output of function 138 becomes active, indicating a Q value which is high enough for determination of CFI; otherwise the output of function 138 is inactive and correspondingly SEL1 is inactive (SEL1=0). Similarly, function 140 tests whether Q is less than an upper limit C2. If it is less than C2, then the output of function 140 becomes active, indicating a Q value which is below an acceptable upper extreme; otherwise the output of function 140 is inactive and correspondingly SEL1 is inactive (SEL1=0). Collectively, functions 138 and 140 assure that Q lies in a range between C1 and C2 before signal CFI passes through selector 134 as output CFU (CFU=CFI).

Function 142 tests whether the absolute value of N1DOT, the first time derivative of N1, is below limit C3. Similarly, function 144 tests whether the absolute value of N2DOT, the first time derivative of N2, is below limit C4. As first derivatives with respect to time, N2DOT and N2DOT reflect the rate of change of N1 and N2 respectively and generally may be used to detect transient operation of engine 40. Because it is preferred that the correction factor determination be based on steady state measurements, functions 142 and 144 are each configured to output an active state only when the absolute value of N1DOT and N2DOT are below the corresponding transient limits of C3 and C4. Conversely, if the absolute value of N1DOT is greater than C3, then the output of function 142 is set to an inactive state which makes SEL1 inactive (SEL1=0). Similarly, the output of function 144 is set to an inactive state if the absolute value of N2DOT is greater than C4, which also makes SEL1 inactive (SEL1= 0). Thus, an inactive output by either function 142 or function 144 corresponds to a transient condition undesirable for correction factor determination. The limits C1, C2, C3 and C4 are selected as a function of performance and design requirements for the given design of system 20.

When the Q signal fails or otherwise becomes unreliable, such that Q is no longer trustworthy, then QFAIL becomes active (QFAIL=1) and selector 134 switches so that CFU= CFPAST for this faulted mode. Signal CFU is stored as CFPAST while SEL1 is active (SEL1=1) to effectively maintain the most recent value of CFI passed through selector 134. When QFAIL becomes active (QFAIL=1), CFPAST is "frozen" to the value of the most recent output signal CFU before the unreliability of Q was determined. Signal CFU is maintained at the constant CFPAST value throughout activation of QFAIL (QFAIL=1). Unreliability of signal Q, as indicated by QFAIL, may be detected by using a scheme that tests whether Q has exceeded an expected range of values, rate of change, or using such other techniques as would occur to one skilled in the art.

Selector 134 switches to pass through signal CFPAST as output CFU (CFU=CFPAST) when QFAIL is active (QFAIL=1) in response to SEL1 becoming inactive (SEL1= 0). QFAIL is input to gate 136 through inverter 146 to provide this function. Inverter 146 inverts discrete signal QFAIL so that the inverter 146 output is inactive when QFAIL is active (QFAIL=1), which makes SEL1 inactive (SEL1=0). Conversely, if QFAIL is inactive (QFAIL=0), inverter 146 provides an active input to gate 136. Thus, gate 136 provides an active SEL1 output (SEL1=1) only when Q is between C1 and C2, the absolute value of N1DOT is less than C3, the absolute value of N2DOT is less than C4, and QFAIL is inactive (QFAIL=0); and in response, selector 134 sets CFU to CFI (CFU=CFI). In contrast, if one or more of the outputs of functions 138, 140, 142, 144, or inverter 146 is inactive, then SEL1 is inactive (SEL 1=0), and selector 134 sets CFU to CFPAST (CFU=CFPAST).

The output of selector 134 (signal CFU) is input to limiter 148 which provides an output signal CF. Output signal CF is the same as input signal CFU (CF=CFU) if CFU lies between a predetermined upper limit UL and lower limit LL. Limiter 148 operates to set output signal CF to UL (CF=UL)

if CFU is greater than or equal to UL and sets output signal CF to LL (CF=LL) if CFU is less than or equal to LL. Output signal CF is input as a denominator (d) to divider 152. Signal QSYN is input as a numerator (n) to divider 152. Divider 152 outputs a corrected synthesized value (signal QSYNC), which accounts for the deviation of engine 40 from the nominal characteristic 122a of function 122. It should be noted that during non-fault operation (QFAIL=0), the synthesized torque (QSYNC) and the actual sensed torque meter torque (Q) are forced to be identical in accordance with the following:

given:
(1) CF=QSYN/Q,
(2) QSYNC=QSYN/CF,
then through substitution:
(3) QSYNC=QSYN/(QSYN/Q)=Q.

Effectively, QSYNC=QSYN/CFI during non-fault operation (QFAIL=0) and QSYNC=QSYN/CFPAST during an accommodation or fault mode of operation (QFAIL=1).

The output of divider 152 is smoothed by filter 154 to eliminate abrupt step changes or other aberrations that may result in undesirable engine performance. Preferably, filter 154 is of a discrete, first order lag configuration. For this embodiment, it is preferred that τ be about 0.4 second. The output of filter 154, QSYNCF, is provided as an input to selector 156. Selector 156 provides output signal QTM which is set to Q (QTM=Q) when arrangement 68 is reliably providing signal Q (QFAIL=0). Conversely, selector 156 switches in response to activation of discrete selection signal SEL2 (SEL2=1) to set output signal QTM to QSYNCF (QTM=QSYNCF). Discrete signal SEL2 is output by "or" gate 158 which adds discrete signals QFAIL and the output of function 160 in a boolean fashion such that if either input is active, SEL2 is active (SEL2=1). Function 160 tests whether Q is above a minimum threshold of C2. Threshold C2 is selected to determine when signal Q is above the maximum reliable input value. In operation, gate 158 selects the synthesized torque signal QSYNCF if the signal Q becomes unreliable as indicated by QFAIL or function 160. Thus, SEL2 provides an accommodation selection signal for selector 156.

The output of selector 156, signal QTM, is then used by controller 70 for various control process and algorithms as needed, whether sourced from arrangement 68 via signal Q or synthesized as signal QSYNCF from one or more other sensors. For example, signal QTM may be used to determine the amount of torque to which gear box 32 is exposed for the purpose of limiting torque or logging excessive torque for overhaul determinations. In another example, QTM may be used to facilitate load or torque sharing between multiple engines, or determine effective output power, where power is a function of torque and power turbine rotational speed. Still other applications of signal QTM are envisioned as would occur to one skilled in the art.

Process 120 may be embedded in hard-wired logic, accomplished using analog signal processing techniques, or a combination of digital and analog processing as appropriate. However, it is preferred that process 120 be provided by a software or firmware routine suitable for execution by a digitally programmable FADEC. It is also preferred that this algorithm be executed on a periodic basis with CFPAST being correspondingly updated by CFU during each periodic execution. The various signals for this embodiment are preferably in a digital form with controller 70 providing appropriate hardware to digitize any of the signals that may originate in an analog form.

Sensors for the present invention may preferably provide a signal in either a digital or analog format compatible with associated equipment. Correspondingly, equipment coupled to each sensor is configured to condition and convert sensor signals to the appropriate format, as required. All sensors are of a known construction. It should also be understood that controller 70 includes all the necessary signal conditioning or pre-processing functionality needed to provide the signals used in process 120.

The curves of characteristic 122a may be embedded in memory 72 of controller 70 as a look-up table, or alternatively provided using curve-fitting techniques. Besides P1, pressure at other stations along a gas turbine engine may be used to determine torque in accordance with the present invention. For example, pressure at station zero (P0), at station 2.5 between a fan and compressor for an engine so configured (P2.5), or at the compressor discharge station 3 (P3 or "CDP") are among the stations from which pressure readings may be used to synthesize torque. Although measurements of N1 and N2 are preferred for process 120, one or both of these measurements may not be needed to provide a suitable synthesized pressure signal in other embodiments of the present invention. By way of non-limiting example, both N1 and N2 may be generally constant relative to the desired degree of accommodation so that measurement of these relatively constant speeds is not necessary to synthesize pressure in accordance with the present invention.

Similarly, although the preferred application of the invention is for a rotary-wing aircraft, other types of aircraft (including turbo-prop propelled vehicles) and other gas turbine engine applications (including ground-based power generation) may be adapted to practice the present invention using techniques known to those skilled in the art. Also, it should be understood that various embodiments of the present invention as disclosed herein and equivalents thereto provide an accommodation means for synthesizing a torque signal.

As used herein, it should be appreciated that: "parameter," "variable," "value," "constant," "memory space," "threshold," "limit," "output," "input," or "memory location" each generally correspond to a signal within controller 70 of the present invention. Furthermore it should be appreciated that as used herein: "parameter," "variable," "value," "constant," "memory space," "threshold," "limit," "output," "input," or "memory location" each generally correspond to one or more signals within controller 70 of the present invention.

It is contemplated that various operations, stages, conditionals, procedures, thresholds, and processes described in connection with the present invention could be altered, rearranged, substituted, deleted, duplicated, combined, or added to other processes as would occur to those skilled in the art without departing from the spirit of the present invention.

All publications, patents, and patent applications cited in this specification are hereby incorporated by reference. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of operating a gas turbine engine having a power turbine, comprising:
   (a) providing a first signal corresponding to a gas pressure associated with performance of the engine;
   (b) providing a second signal corresponding to rate of change of rotational speed of the power turbine;

(c) providing a third signal corresponding to torque produced by the engine;

(d) generating a fourth signal from the first and second signals, the fourth signal corresponding to torque produced by the engine; and (e) using the fourth signal in place of the third signal if the third signal is determined to be unreliable.

2. The method of claim 1, wherein the gas pressure corresponds to inlet pressure of the engine.

3. The method of claim 1, wherein said generating includes establishing a deviation of the engine from nominal by comparing the third and fourth signals before the third signal is determined to be unreliable and correcting for the deviation.

4. The method of claim 1, wherein said generating includes providing a dynamic torque signal corresponding to dynamic torque of the engine.

5. The method of claim 1, further comprising driving an aircraft propulsion mechanism with the engine.

6. The method of claim 1, further comprising establishing steady state operation of the engine as a function of the second signal.

7. The method of claim 1, wherein the engine includes a gas generating spool providing working fluid to drive the power turbine, and further comprising:

providing a fifth signal representing rotational speed of the gas generating spool;

providing a sixth signal representing inlet temperature of the engine; and further generating the fourth signal as a function of the fifth and sixth signals.

8. An aircraft propulsion system, comprising:

(a) a gas turbine engine;

(b) a first sensor configured to provide a first torque signal corresponding to torque produced by said engine;

(c) a second sensor configured to provide a pressure signal corresponding to a gas pressure at a pre-combustion station of said engine;

(d) a controller responsive to said first torque signal and said pressure signal to generate:

a second torque signal corresponding to torque produced by said engine, said second torque signal being determined as a function of said pressure signal, an accommodation signal when said first torque signal is determined to be unreliable; and wherein said controller is configured to respond to said accommodation signal to operate with said second torque signal in place of said first torque signal.

9. The system of claim 8, wherein said pressure signal corresponds to inlet pressure of said engine.

10. The system of claim 8, wherein said engine includes a first turbine configured to turn a first shaft and a second turbine configured to turn a second shaft.

11. The system of claim 10, further comprising an aircraft propulsion mechanism configured to be driven by said second shaft, said mechanism including a gear box and a rotary wing.

12. The system of claim 10, further comprising:

a third sensor configured to provide a first speed signal indicative of rotational speed of said first shaft; and a fourth sensor configured to provide a second speed signal indicative of rotational speed of said second shaft.

13. The system of claim 12, wherein said controller includes a memory having a plurality of values corresponding to a relationship between said pressure signal, said first speed signal, and said second speed signal.

14. The system of claim 12, wherein said second torque signal is further determined in accordance with a rate of change of at least one of said first and second signals.

15. The system of claim 12, wherein said first sensor and said fourth sensor are provided by a dual sensor arrangement coupled to said second shaft and further comprising a fifth sensor configured to provide a temperature signal corresponding to inlet temperature of said engine.

16. An aircraft propulsion system, comprising:

(a) a gas turbine engine with a first turbine configured to drive a first shaft and a second turbine configured to drive a second shaft;

(b) a first sensor configured to provide a measured torque signal corresponding to torque from rotation of said second shaft;

(c) a second sensor configured to provide a pressure signal corresponding to a gas pressure associated with said engine;

(d) a third sensor configured to provide a first speed signal corresponding to rotational speed of said first shaft;

(e) a fourth sensor configured to provide a second speed signal corresponding to rotational speed of said second shaft; and (f) a controller including an accommodation means for generating a synthesized torque signal from said pressure signal, said first speed signal, and said second speed signal, said controller being configured to operate with said synthesized torque signal in place of said measured torque signal when said measured torque signal is determined to be unreliable.

17. The system of claim 16, further comprising an aircraft propulsion mechanism configured to be driven by said second shaft, said mechanism including a gear box and a rotary wing.

18. The system of claim 16, wherein said pressure signal corresponds to inlet pressure of said engine.

19. The system of claim 16, wherein said controller includes a memory having a plurality of values corresponding to a relationship between said pressure signal, said first speed signal, and said second speed signal.

20. The system of claim 16, wherein said synthesized torque signal is further determined as a function of rate of change of at least one of said first and second speed signals.

21. The system of claim 16, wherein said first sensor and said fourth sensor are provided by a dual sensor arrangement coupled to said second shaft.

22. A method of operation for a gas turbine engine, comprising:

(a) sensing a torque produced by the engine with a torque sensor;

(b) determining the sensor is performing unreliably; and (c) operating the engine with the torque being determined as a function of gas pressure at a pre-combustion station of the engine during unreliable performance of the sensor.

23. The method of claim 22, wherein said operating includes detecting a deviation of the engine from nominal and correcting for the deviation.

24. The method of claim 22, wherein said operating includes determining the torque as a function of rotational speed of at least one rotating member of the engine.

25. The method of claim 22, further comprising driving an aircraft propulsion mechanism with the engine.

26. The method of claim 22, wherein said operating includes sensing gas pressure at the pre-combustion station with a pressure sensor and sensing engine inlet temperature with a temperature sensor.

27. The method of claim 26, wherein the engine includes a gas generating spool providing working fluid to drive a power turbine, and said operating includes determining torque as a function of rotational speed of the gas generating spool and the power turbine.

28. An operation method for a gas turbine engine, comprising:
(a) sensing torque produced by the engine with a sensor to provide a measured torque signal for operation of the engine in a non-fault mode;
(b) generating a synthesized torque signal from a nominal relationship between at least two engine parameters; (c) establishing an adjustment signal corresponding to deviation of the engine from the nominal relationship; and
(d) correcting the synthesized torque signal with the adjustment signal and operating the engine with the synthesized torque signal in place of the measured torque signal during a fault mode of engine operation, the fault mode being established when the measured torque signal is determined to be unreliable.

29. The method of claim 28, wherein said establishing includes comparing the measured and synthesized torque signals during the non-fault mode.

30. The method of claim 28, wherein one of the parameters corresponds to an inlet gas pressure of the engine.

31. The method of claim 28, wherein the engine has a first turbine and a second turbine, and said generating includes sensing a first rotational speed of the first turbine and a second rotational speed of the second turbine.

32. The method of claim 31, wherein the parameters include a first parameter corresponding to the first rotational speed, a second parameter corresponding to the second rotational speed, and a third parameter corresponding to a gas pressure associated with operation of the engine.

33. The method of claim 32, further comprising establishing steady state operation of the engine as a function of a rate of change of at least one of the first and second rotational speeds.

34. The method of claim 28, further comprising driving an aircraft propulsion mechanism with the engine.

35. An aircraft propulsion system, comprising:
(a) a gas turbine engine having a gas generating spool configured to provide working fluid to a power turbine;
(b) a first sensor configured to provide a first torque signal corresponding to torque produced by said engine;
(c) a second sensor configured to provide a pressure signal corresponding to a gas pressure associated with performance of said engine;
(d) a third sensor configured to provide a first speed signal corresponding to rotational speed of said power turbine;
(e) a controller responsive to said first torque signal, said pressure signal, and said first speed signal to generate:

a second torque signal corresponding to torque produced by said engine, said second torque signal being determined as a function of said pressure signal and a rate of change of rotational speed of said power turbine, said rate being determined from said first speed signal;

an accommodation signal corresponding to unreliable performance of said first torque signal; and wherein said controller is configured to respond to said accommodation signal to operate with said second torque signal in place of said first torque signal.

36. The system of claim 35, wherein said pressure signal corresponds to inlet pressure of said engine.

37. The system of claim 35, further comprising an aircraft propulsion mechanism configured to be driven by said power turbine.

38. The system of claim 35, further comprising a fourth sensor configured to provide a second speed signal corresponding to rotational speed of said gas generating spool.

39. The system of claim 38, wherein said controller includes a memory having a plurality of values corresponding to a relationship between said pressure signal, said first speed signal, and said second speed signal.

40. The system of claim 38, wherein said first sensor and said fourth sensor are provided by a dual sensor arrangement coupled to said second shaft.

41. A method of operating a gas turbine engine having a first turbine and a second turbine, the second turbine being configured to turn a drive shaft, comprising:
(a) providing a first signal representing a gas pressure associated with performance of the engine;
(b) providing a second signal corresponding to rotational speed of the first turbine;
(c) providing a third signal corresponding to rotational speed of the second turbine;
(d) providing a fourth signal corresponding to torque produced by the engine;
(e) generating a fifth signal from the first, second, and third signals, the fifth signal corresponding to torque produced by the engine; and
(f) using the fifth signal in place of the fourth signal if the fourth signal is determined to be unreliable.

42. The method of claim 41, wherein the gas pressure corresponds to inlet pressure of the engine.

43. The method of claim 41, wherein said generating includes providing a dynamic torque signal corresponding to dynamic torque of the engine.

44. The method of claim 41, further comprising driving an aircraft propulsion mechanism with the engine.

45. The method of claim 41, further comprising establishing steady state operation of the engine as a function of at least one of the second and third second signals.

* * * * *